Patented Apr. 15, 1930

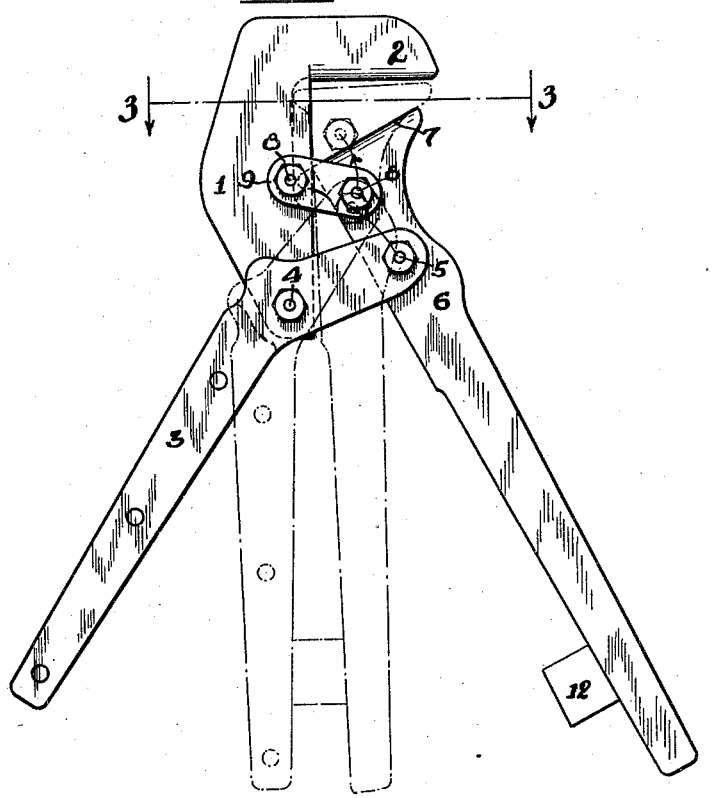
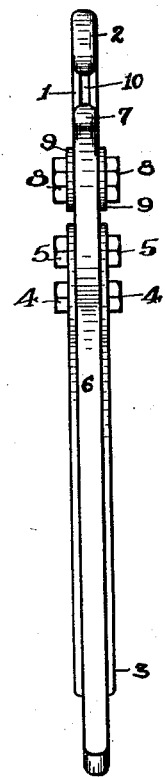
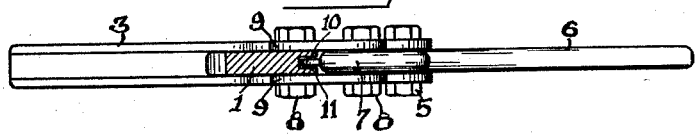

1,754,241

UNITED STATES PATENT OFFICE

HARVEY A. RUSSELL, OF MADERA, CALIFORNIA

CORD-SEVERING IMPLEMENT

Application filed March 27, 1929. Serial No. 350,293.

This invention relates to improvements in implements of the kind adapted for use in severing the spermatic cord of animals.

An object of my invention is to provide an improved implement for severing the spermatic cord of animals.

Another object of my invention is to provide an improved device for securely maintaining the spermatic cord of an animal within the jaws of the device while they are actuated toward each other to sever the cord.

A further object of my invention is to provide an improved implement having a pair of jaws which may be so actuated toward each other that an object positioned between them may be securely held while the jaws are moved against the object.

A still further object of my invention is to provide an implement having a pair of jaws which are adapted to securely hold an object while the jaws are being actuated against the same.

Other objects more or less apparent will present themselves or will be specifically pointed out in the description to follow.

In the accompanying drawings:

Fig. 1 is a side view of an implement embodying my invention, showing by the dotted lines the relative position of the various parts thereof when the jaws are brought in close proximity with each other;

Fig. 2 is a front view of the implement; and

Fig. 3 is a sectional view taken on the line 3—3 of Fig. 1.

Referring to the drawings the numeral 1 represents a carrier member having an outwardly protruding jaw 2 at one end, and a lever member 3 pivotally attached to its other end as by a bolt 4. The lever member, at one of its ends, is provided with a handle, while its opposite end is provided with two forked parts between the extreme ends of which is pivotally attached, as by a bolt 5, a shank 6. The shank is provided at one of its ends with a handle of approximately the same length as the handle of the lever member 3, and at its opposite end with a jaw 7. Pivotally attached as by bolts 8 to the carrier member 1 and the shank 6 at pre-determined points between their respective jaws and the forked parts of the lever member 3, are a pair of connecting links 9. The carrier member is provided at its inner edge with a slot 10 within which a projection 11 of the shank 6 is slidably located. The slot and the projection provide suitable means for confining the movement of the jaw 7 within a definite path relative to the jaw 2 of the carrier member 1. Each of the jaws 2 and 7 are provided at adjacent sides with rounded edges which facilitate the severing of a cord or object when the same is acted upon by the manipulation of the implement. A projection 12 secured to the handle of the shank 6 is adapted principally to contact with the handle of the lever member 3 to keep the jaws 2 and 7 from contacting with each other.

The links 9, being pivotally attached to the carrier 1 and the shank 6 at predetermined points thereon, serve to confine the movement of the jaw 7 within a fixed arcuate path, as indicated by the arrow in Fig. 1. When the handle of the lever member 3 and the handle of the shank 6 are drawn together, the forked end of the latter actuates the jaw 7 of the former toward the jaw 2 of the carrier member 1. During this movement the links 9 maintain the inwardly disposed edge of the jaw 7 at a lower point than its upper or outwardly disposed edge, thereby causing a spermatic cord or object placed between the two jaws to slide toward the slotted edge of the carrier member 1 rather than away from the same. Upon actuating the handles of the lever member and the shank toward each other the two jaws 7 and 2 are brought closer together with the rounded edge of the jaw 7 maintained by the links 9 in an inclined position with reference to the rounded edge of the jaw 2. The extremely tough spermatic cord of an animal, when placed between the jaws 2 and 7, is securely maintained between the said jaws as the two handles are operated toward each other as described, thereby enabling the rounded edges of the said jaws to satisfactorily sever the same.

It is apparent to those skilled in the art that my invention may be constructed in other forms than the one shown, so for this and other apparent reasons I desire my invention included broadly within the spirit of the appended claims.

Having described my invention, what I claim is:

1. A funis severing implement, comprising a carrier member having a jaw on one end thereof, a lever member pivotally attached to the carrier member at its other end, a shank pivotally attached to an end of the lever member, and a link pivotally attached to the shank and the carrier member.

2. A funis severing implement comprising a carrier member having a jaw at one end thereof, a lever member pivotally attached to the carrier member, a link pivotally attached to the carrier member at a point between its jaw and the point thereon where the lever member is attached thereto, a shank pivotally attached to the lever member and to the link.

3. A funis severing implement comprising a carrier member having a jaw secured to one end and a lever member pivotally attached to its other end, a link pivotally attached to the carrier member at a point between its two ends, and a shank pivotally attached to the link and the lever member.

In testimony whereof I affix my signature.

HARVEY A. RUSSELL.